United States Patent [19]

Kuhn et al.

[11] Patent Number: 4,503,749

[45] Date of Patent: Mar. 12, 1985

[54] COMBINE VISOR WITH ENVIRONMENTAL COMPONENTS

[75] Inventors: Lowell L. Kuhn, Independence, Mo.; Stephen G. Miggels, Wyckoff, N.J.

[73] Assignee: Allis-Chalmers Corporation, Milwaukee, Wis.

[21] Appl. No.: 594,285

[22] Filed: Mar. 28, 1984

[51] Int. Cl.³ ............................................. B60H 1/26
[52] U.S. Cl. ...................................... 98/2.11; 62/244
[58] Field of Search .................... 62/244; 98/2, 2.11, 98/2.14, 2.15, 33 A

[56] References Cited

U.S. PATENT DOCUMENTS

| | | | |
|---|---|---|---|
| 3,868,896 | 3/1975 | Doll et al. | 98/2.11 |
| 4,097,085 | 6/1978 | Nelson | 62/244 X |
| 4,185,867 | 1/1980 | Schmidt et al. | 296/187 |
| 4,189,987 | 2/1980 | Amberg et al. | 98/2.14 |

Primary Examiner—Harold Joyce
Attorney, Agent, or Firm—Charles L. Schwab

[57] ABSTRACT

A self-propelled agricultural harvester is provided with an operator's cab which has a combined roof and visor in which environmental components and accessories are mounted.

9 Claims, 8 Drawing Figures

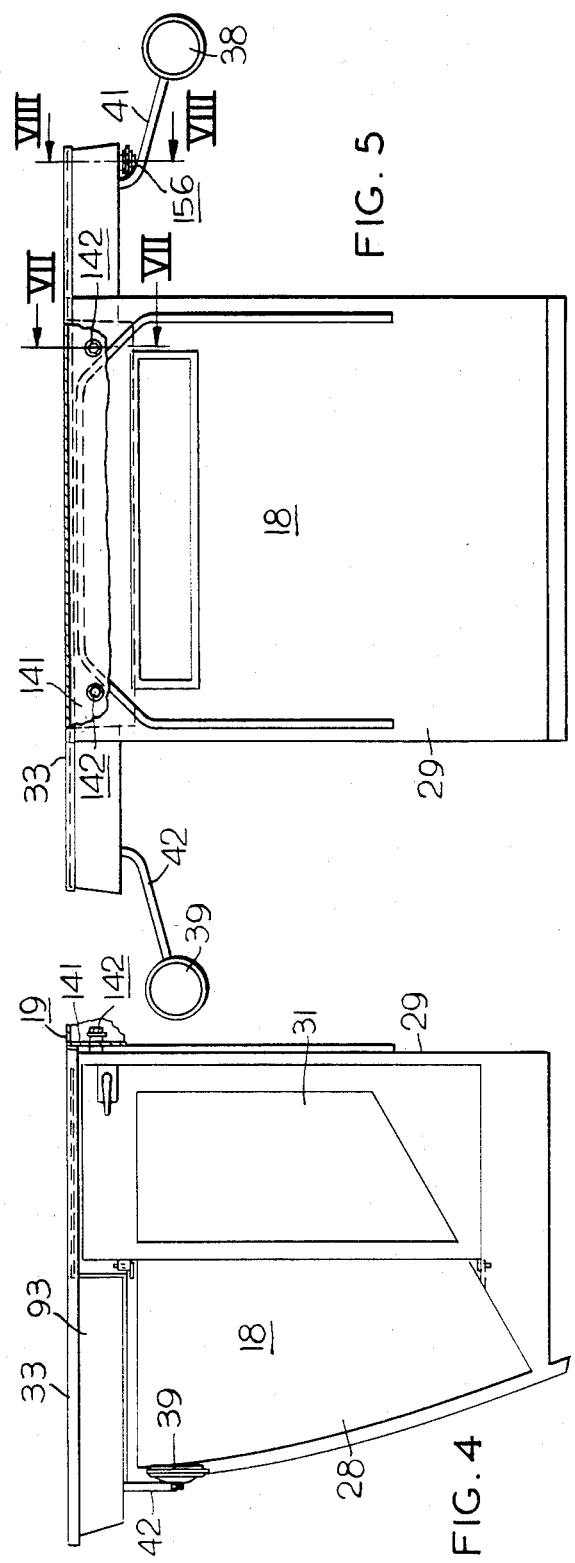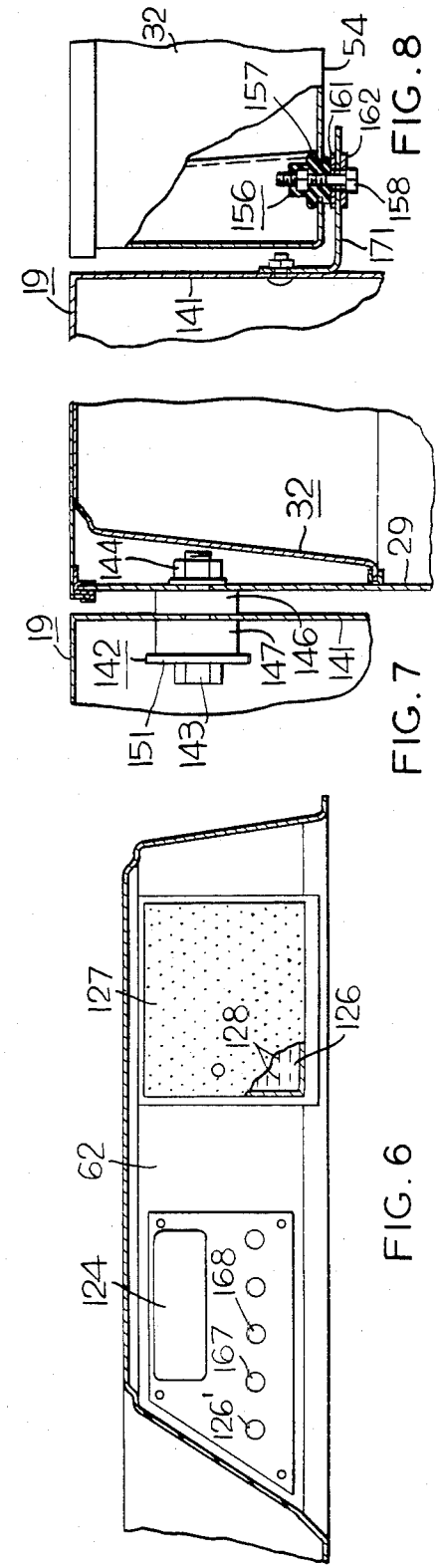

COMBINE VISOR WITH ENVIRONMENTAL COMPONENTS

TECHNICAL FIELD

An agricultural harvester or combine is provided with an overhead visor and roof structure for the operator's cab which houses environmental components for filtering and conditioning the air for the operator's cab.

BACKGROUND OF THE INVENTION

Heretofore, a visor structure has been provided for the cab of a harvester. One such structure is shown in U.S. Pat. No. 4,185,867, issued Jan. 29, 1980, to William M. Schmidt, Stanley E. Thorwaldsen, David C. McElroy and Stephen G. Miggels for a "Harvester with a Laterally Extending Visor Structure". The visor structure shown in U.S. Pat. No. 4,185,867 includes portions secured to the cab roof which extend forwardly and laterally to each of the opposite sides of the cab roof except in the area of the cab door. The air conditioning apparatus, including the air filter, air passageways, heater and cooler, is contained in the cab rather than in the visor parts added to the cab. The prior art visor structure is used to mount operating lights and rear view mirrors. U.S. Pat. No. 3,868,896 shows a forced air ventilating system in the top of a tractor cab and U.S. Pat. No. 4,189,987 illustrates a temperature control system for a tractor cab with environmental components in the roof.

SUMMARY OF THE INVENTION

The combined visor and roof of this invention includes a one-piece headliner which serves as a roof for the cab as well as a visor for the front and laterally opposite sides of the cab. The headliner is secured to the tops of the longitudinally spaced front and rear walls of the cab and to the tops of the laterally spaced side walls. One of the side walls includes a door by which the operator can enter and leave the cab. The headliner does not extend laterally from that portion of the one wall which mounts the door. A first vertical opening defining an air inlet is formed in the visor portion extending laterally from the side wall in which the door is mounted and a downwardly removable air filter is installed in the air inlet. An air conditioning unit, which may include both a heater and a cooler, is mounted in the visor portion of the headliner extending outwardly from the other of the side walls. A flat top, which may be in one piece, is installed on top of the headliner. Walls rigidly secured to and extending upwardly from the bottom of the headliner to the flat top define an air inlet passageway between the air inlet and an air intake of the air conditioning unit. A second vertical opening in the portion of the headliner over the front part of the cab defines an air outlet by which air may pass from the cab into the air inlet passageway. Air flow control apparatus is operatively associated with the air outlet and with the air inlet passageway which is operable to selectively proportion the flow of air from the cab and from the air inlet to the air intake opening of the air conditioning unit. The air flow control assembly may include a damper pivotally mounted on the headliner in the air inlet passageway for progressive movement between a closed position in which the damper substantially prevents air from passing from the cab by way of the air outlet and an open position in which air is permitted to flow from the cab through the air outlet and through part of the air inlet passageway to the air conditioning unit. In the open position, the damper restricts outside air flow to the air conditioning unit from the air inlet. Wall means are also present in the headliner defining a conditioned air passageway connected to the air output of the air conditioning unit. The conditioned air passageway is disposed at the rear of the air inlet passageway in the portion of the headliner disposed above the front of the cab where air delivery vents or openings deliver conditioned air into the cab.

The combined cab roof and visor structure provides an air filter which is on the outside of the cab convenient to a serviceman standing on the entrance platform to the cab. Not only are the environmental components such as the filter and air conditioning unit conveniently mounted in the combined roof and visor structure, but also a storage compartment for food and drink is provided which is heated or cooled depending on the operating mode of the air conditioning unit. Additionally, the controls and accessories mounted in the headliner are in a filtered air environment and readily accessible for servicing. Provision of a removable top facilitates replacement or repair of operating components installed in the headliner.

BRIEF DESCRIPTION OF THE DRAWINGS

FIG. 3 is a top view of the combined roof and visor structure with the top removed;

FIG. 4 is a left-hand side view of the operator's cab shown in FIG. 1;

FIG. 5 is a rear view of the operator's cab shown in FIG. 4;

FIG. 6 is a view taken along line VI—VI in FIG. 3;

FIG. 7 is a view taken along the line VII—VII in FIG. 5; and

FIG. 8 is a view taken along the line VIII—VIII in FIG. 5.

DETAILED DESCRIPTION OF THE DRAWINGS

Figure 1:
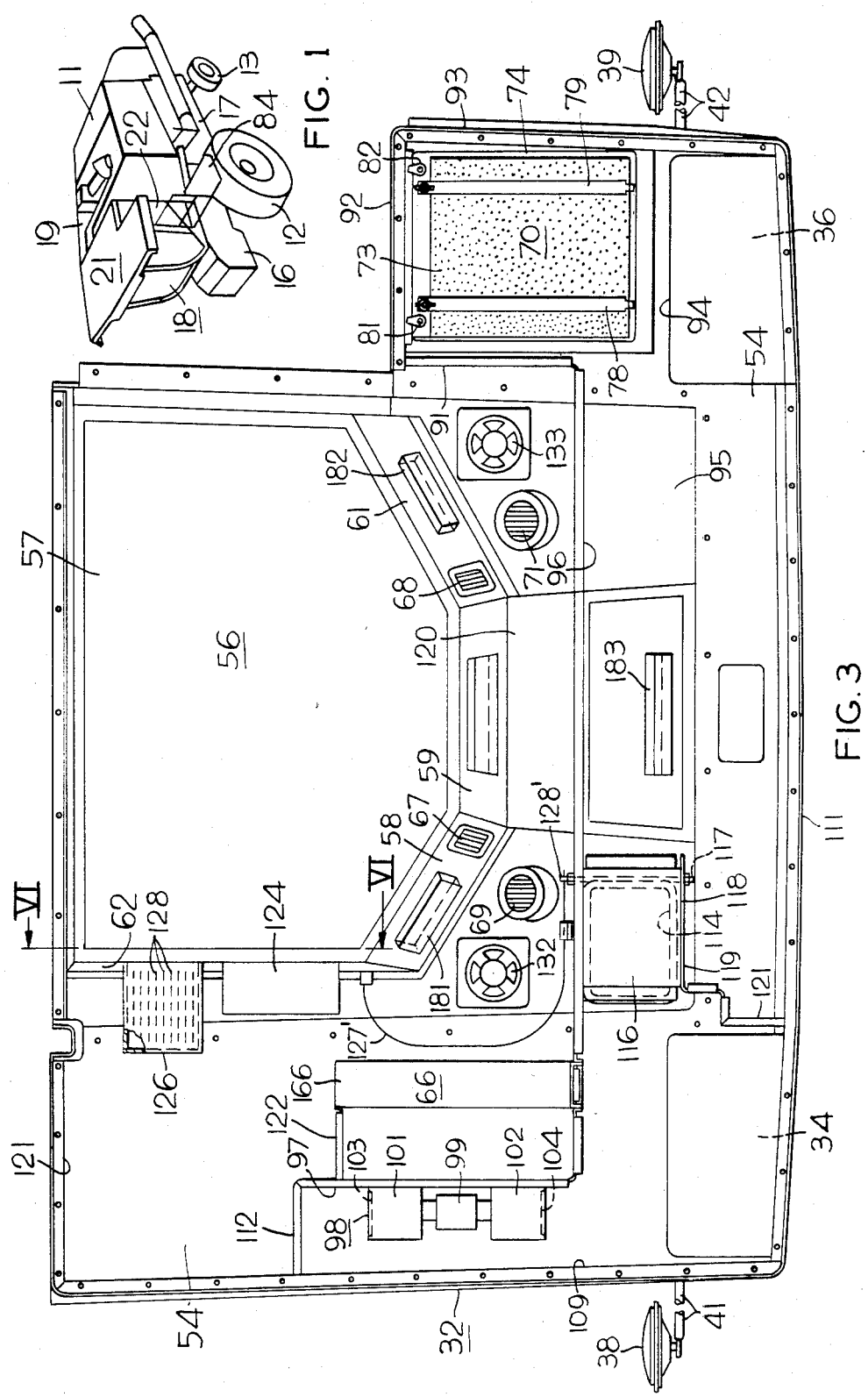
FIG. 1 is a perspective view of the main body of a combine in which the present invention is incorporated.

Referring to FIG. 1, an agricultural harvester or combine 11 is provided with a pair of front driving wheels 12, only one of which is shown, and a pair of rear steerable wheels 13, only one of which is shown. A feeder conveyor 16 is pivotally mounted on a transverse axis to the front of the combine main frame 17 and an operator's station or cab 18 is supported on the main frame 17 above the feeder conveyor 16 and in front of a grain tank 19. A combined roof and visor structure 21 is mounted on top of the front, rear and side walls of the operator's cab 18 and includes portions extending forwardly of the front wall of the cab and portions extending laterally outwardly beyond the side walls of the cab except in the area of the operator's access door 22. The removable combine header is not shown in FIG. 1.

Figure 2:
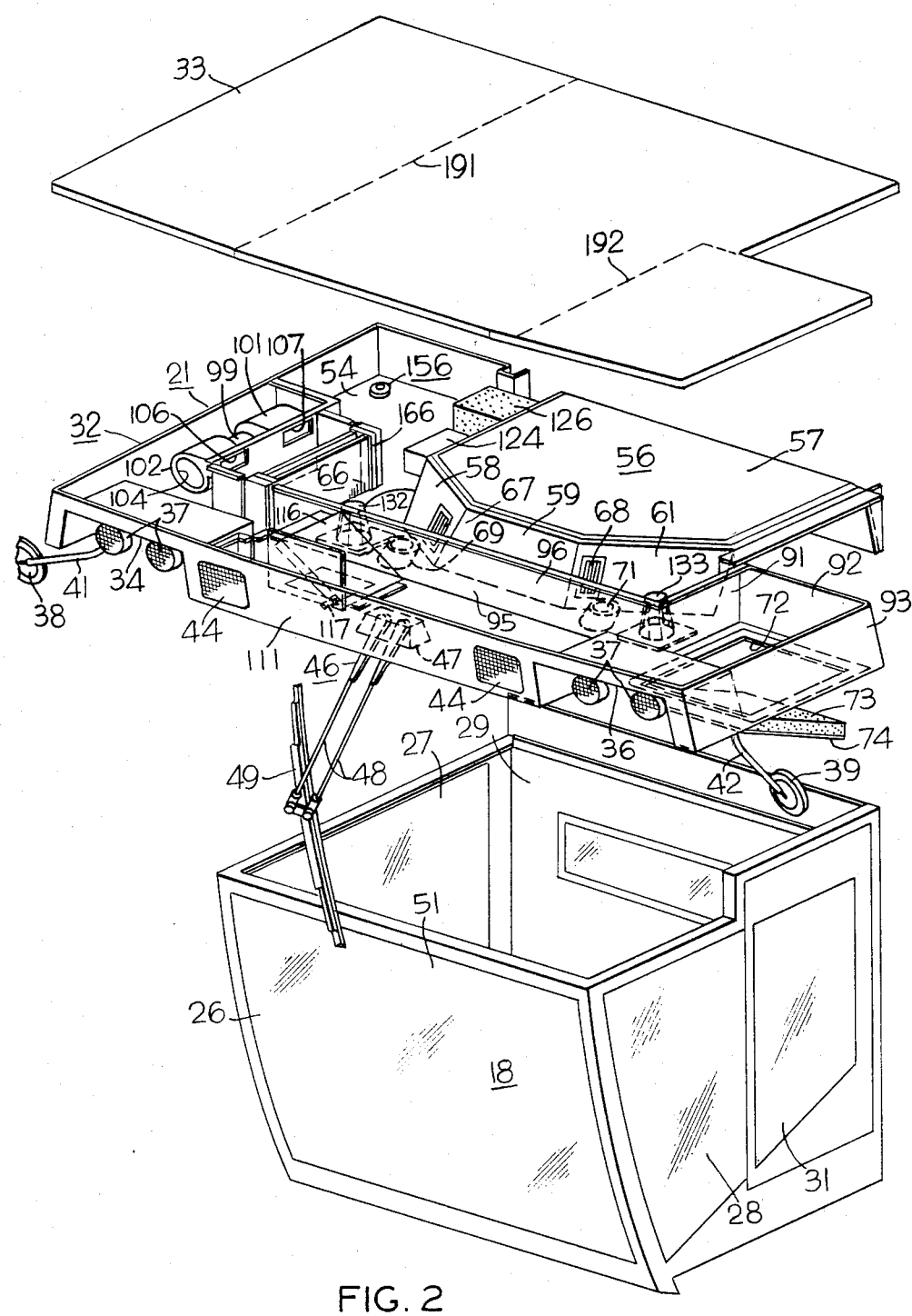
FIG. 2 is an exploded view of the combined roof and visor structure of the present invention.

Referring to FIGS. 2 and 3, the operator's cab 18 includes a front wall 26 and laterally opposite side walls 27, 28 and a rear wall 29. The side wall 28 includes a doorway in which a door 31 is installed. It will be noted that the top of the rear wall 29 and the the top of the portion of the left-hand side wall above the door 31 are at a higher elevation than the tops of the remainder of the side wall 28, the front wall 26 and the other side wall 27. This is to facilitate the mounting of the visor and roof structure 21 and to provide interior space for components and air passages. The visor and roof structure 21 is comprised of two main parts, namely, a lower headliner 32 and a flat roof or top 33. The headliner 32 is a one-piece molded fiberglass part and includes downwardly and forwardly open recesses 34, 36 in which field lights 37 are mounted. Also, rear view mirrors 38, 39 have the laterally inner ends of their mounting arms 41, 42 secured to the headliner 32 at a location within the recesses 34, 36. In addition to the field lights 37, a pair of driving lights 44 are installed in the front wall 111 of the headliner 32. A windshield wiper unit 46 has its control box 47 installed in the bottom wall or bottom 54 of the headliner 32 and includes parallel arms 48 extending downwardly to a wiper blade unit 49 which is operable to wipe the windshield 51 in the front wall 26 of the cab 18. The recesses 34, 36 and the front visor portion of the headliner 32 in which the driving lights 44 and the windshield wiper 46 are installed are disposed generally forwardly of the front wall 26 of the cab 18.

The bottom 54 of the headliner is generally flat and extends outwardly from the cab side walls 27, 28 and the front wall 26. The headliner 32 also includes a raised portion 56 above the central and rear part of the cab which has a flat roof part 57 with forwardly and downwardly sloping segments 58, 59, 61 at its front and a substantially vertical side wall 62. The floor or bottom 54 of the headliner 32 is divided by upstanding walls into air passages by which inlet air is drawn from the outside and passed through an air conditioning unit 66 and then delivered to the interior of the cab through conditioned air delivery openings or vents 67, 68, 69, 71. The air conditioning unit 66 includes a combined heating/cooling coil assembly 166 whereby the air passing to the cab may be either heated or cooled by operation of controls, not shown, except for knobs 167, 168 shown in FIG. 6. The headliner bottom 54 includes an opening 72 for receiving an air filter unit 70 including a filter 73 mounted in a frame 74. The frame 74 is pivotally connected at its foward end by a hinge, not shown, to the bottom wall 54 of the headliner 32. Releasable longitudinal support straps 78, 79 hold the filter 73 on the frame 74. When the filter unit 70 is swung upwardly from its downward pivoted position shown in FIG. 2 to its installed position shown in FIG. 3, a pair of pivot tabs 81, 82 are rotated to engage the upper rear edge of the air inlet opening 72 to hold the filter frame 74 in place. As is apparent from the drawings, the filter 73 is accessible from the operator's entrance platform 84 at the outside of the cab 18. The headliner 32 at its left-hand side (the right side of FIG. 3) has vertical walls 91, 92, 93 extending upwardly from the bottom wall 54 which, together with the rear wall 94 of the light recess 36, surround the opening 72 except for a gap between the front of wall 91 and the front wall 111. A longitudinally extending inlet air passageway 95 for movement of fresh air from the filter unit 70 to the air conditioning unit 66 is defined by wall means including the bottom 54, the top 33, the front wall 111 and a transverse vertical wall 96 extending between the front end of wall 91 and the front end of a longitudinally extending vertical wall 97 on which a blower unit 98 is mounted. Definition of the inlet air passageway 95 is completed by the vertical side wall 109, the vertical wall 97, and a short transverse vertical wall 112 extending between the rear end of wall 97 and the longitudinally extending side wall 109. The blower unit 98 includes an electric motor 99 which drives a pair of blowers 101, 102 having air intakes 103, 104 and air outlets 106, 107 (shown in FIG. 2). The bottom wall 54 of the headliner 32 includes a vertical air outlet or opening 114 which opens into the cab 18. A damper 116 is pivotally mounted in the visor by a longitudinally disposed pivot pin 117 which is secured for movement with the damper 116 and is pivotally supported by the wall 96 and a vertical wall 118. The vertical wall 118 includes a transversely extending portion 119 adjacent the front edge of the damper 116 and a portion 121 which extends forwardly to the front wall 111. In the downwardly disposed position of the damper 116, only fresh air is passed through the air conditioning unit 66 by the blower unit 98 because the damper 116 closes the air outlet 114. In the raised position of the damper 116, as shown in FIG. 2, air is virtually blocked from passing from the air filter 73 to the air intakes 103, 104 of the blowers 101, 102 and air is drawn, by way of the open outlet 114, from the interior of the cab by the blower unit 98. The conditioned air from the air conditioning unit 66 is directed to the cab by way of a conditioned air passageway 120 defined by wall means including the top 33, the bottom 54 of the headliner and by transversely extending vertical wall 96, the wall 91 and the downwardly sloping segments 58, 59, 61 of the raised portion above the rear part of the cab 18. The conditioned air delivery passageway 120 also includes an area bounded by the upright wall 62, a vertical rear wall 121, part of a vertical side wall 109, the wall 112, a part of wall 97 and a short wall 122. The heater/cooler coil unit serves as an output opening for delivery of conditioned air.

As shown in FIGS. 3 and 6, a storage compartment 126 is disposed within the conditioned air passageway 120 and includes a door 127 within the cab which may be opened by the operator to obtain access to the compartment 126. The side walls of the compartment 126 may be made of a foraminous material or may otherwise include openings 128 permitting conditioned air to flow into the compartment 126. The door 127 of the compartment may be formed of foraminous material or otherwise provided with openings to permit passage of air therethrough. When the air conditioning unit is operating in a cooling mode, the compartment 126 will be cooled and will be a suitable place to store soda or other items the operator might wish to keep cool. When the air conditioning unit is operated in a heating mode, the interior of the compartment 126 will be maintained in a heated condition and will be a suitable location for storing food or other items the operator wishes to keep warm. The wall 62 also serves as a location for mounting a radio unit 124 and a control knob 126' for a push/pull cable 127' which is connected to an upstanding lever 128' secured to the pivot pin 117. When the knob 126' is operated, the damper 116 will be pivoted about a longitudinal pivot axis between its closed position shown in FIG. 3 in which the air outlet 114 is closed to an upwardly slanting position as shown in FIG. 2 in which the fresh air passageway between the filter 73 and air conditioning unit 66 is virtually blocked off thereby substantially restricting the flow of outside air through the filter 73. The damper 116 may also be progressively moved, by moving the knob 126', to intermediate positions of adjustment so as to proportion or blend the fresh air and recirculated air. Also mounted in the bottom 54 of the headliner 32 are radio speakers 132, 133. Various controls are provided in the cab 18 by which the operator efficiently operates the combine. Some of the controls are mounted on the headliner, such as a switch panel 181 for lights, a microprocessor 182 and microprocessor digital readout panel 183.

Referring to FIGS. 4, 5, 7 and 8, the rear wall 29 of the cab 18 is secured to the front vertical wall 141 of the grain bin 19 by a pair of laterally spaced cushion mounts 142. Each of the cushion mounts 142 includes a bolt 143, a nut 144, a first resilient rubber-like donut shaped shock absorbing part 146 and a second resilient rubber-like donut shaped shock absorbing part 147. Part 146 is installed between the rear wall 29 of the cab and the front wall 141 of the grain bin 19. The cushioning part 147 is installed between a washer 151 on the head end of the bolt 143 and the vertical wall 141 of the grain bin 19. Referring to FIG. 8, the right-hand end of the visor headliner 32 is supported at its laterally outer end by a shock absorbing connector unit 156 which includes a rubber resilient shock absorbing part 157, a bolt 158 extending through the part 157 and washers 161, 162. The shock absorbing connector 156 secures the bottom wall 54 of the headliner 32 to an L-shaped bracket 171 mounted on the wall 141 of the grain bin 19.

By designing the cab roof and visor as an integral unit the cost is reduced, the time required for assembly, disassembly and servicing is reduced and the quality of the product is improved through reduction in the number of parts and adequate space for mounting add-on components and accessories. By mounting the air filter 73 in the visor outside the cab the dirt is kept out of the cab (as contrasted to a previous design wherein the filter was removed via the interior of the cab). The vertical wall means including walls 91, 96, 97, 112 serves as a separating wall shared by the inlet air passageway 95 and the conditioned air passageway 120. Placing the blower assembly 98 of air conditioning unit 66 on the wall 97 in a portion of the visor structure laterally outward from the cab 18 tends to reduce blower noise transmitted to the interior of the cab. The flat top 33 may be a one piece molded fiberglass structure; however, weight, size and manufacturing considerations may make it desirable to make the top 33 in three pieces as divided by broken lines 191, 192.

The embodiments of the invention in which an exclusive property or privilege is claimed are defined as follows:

1. A visor and roof structure for a combine cab having upwardly extending front, rear and side walls with a door mounted in one of the side walls, said visor and roof structure comprising:
   a horizontally disposed headliner secured to said front, rear and side walls, said headliner extending across the top of said cab to form a roof for the latter and including visor portions extending horizontally outward from said front and side walls except from the part of said one side wall in which said door is mounted, said headliner having a bottom presenting a first opening defining an air inlet in said visor portion extending outwardly from said one side wall and a second opening above said cab defining an air outlet from said cab,
   a removable flat top releasably secured to said headliner,
   an air filter in said air inlet, said air filter being downwardly removable from said inlet,
   an air conditioning unit mounted in said visor portion of said headliner extending outwardly from the other of said side walls, said air conditioning unit having at least one intake opening and at least one output opening,
   walls rigidly secured to and extending upwardly from said bottom of said headliner to said top defining an air inlet passageway extending between said air inlet and said air intake opening of said air conditioning unit, said air inlet passageway including the portion of said bottom in which said air outlet is presented,
   a damper pivotally mounted on said headliner in said air inlet passageway for progressive movement between a closed position in which said damper substantially prevents air from passing from said cab to said air inlet passageway by way of said air outlet and an open position in which air is permitted to flow from said cab through said air outlet to said air conditioning unit and in which said damper restricts air flow to said air conditioning unit from said air inlet,
   wall means in said headliner defining a conditioned air passageway connected to said air output opening of said air conditioner unit, a part of said conditioned air passageway being disposed at the rear of said air inlet passageway in the portion of said headliner disposed above the front of said cab, and
   conditioned air delivery vents in said conditioned air passageway of said headliner for delivering conditioned air into said cab.

2. The structure of claim 1 and further comprising compartment walls in said visor portion of said headliner extending from said other wall of said cab defining a storage compartment with an entry opening into said cab permitting access from the latter and openings in at least one of said compartment walls permitting flow of conditioned air from said conditioned air passageway into said storage compartment.

3. The structure of claim 1 wherein said headliner includes a raised portion above at least the rear half of said cab to provide head room for the operator.

4. The structure of claim 1 wherein the front wall of said cab includes a windshield and further comprising a windshield wiper mounted on the visor portion of said headliner extending forwardly from said front wall.

5. The structure of claim 1 wherein said headliner is substantially a one-piece molded part.

6. The structure of claim 5 wherein said headliner includes forwardly and downwardly open recesses at the underside of its laterally opposite front extremities and further comprising operating lights secured to said headliner and disposed within said recessses.

7. A combined visor and roof structure for a combine cab of the type having upwardly extending front, rear and side walls with a door mounted in one of the side walls, said visor and roof structure comprising:
   a horizontally disposed one-piece headliner secured to said front, rear and side walls, said headliner extending across the top of said cab to form a roof for the latter and including visor portions extending horizontally outward from said front and side walls except from the part of said one side wall in which said door is mounted, said headliner having a bottom presenting a first opening defining an air inlet in said visor portion extending outwardly from said one side wall and a second opening above said cab defining an air outlet from said cab,
   a removable flat top releasably secured to said headliner, an air filter in said first opening, said air filter being downwardly removable from said first vertical opening, an air conditioning unit mounted in said visor portion of said headliner extending outwardly from the other of said side walls, said air conditioning unit having an air intake opening and an air output opening, walls extending upwardly from said bottom of said headliner to said top to define an air inlet passageway between said air inlet and said air intake opening of said air conditioning unit, said air inlet passageway extending laterally across the top front of said cab and including the portion of said bottom in which said air outlet is presented, and air flow control apparatus operatively associated with said air outlet and said air inlet passageway operable to selectively proportion the flow of air from said cab and from said air inlet to said air intake opening of said air conditioning unit, passage defining walls extending vertically between said bottom of said headliner and said top defining a conditioned air passageway connected to said air output opening of said air conditioner unit and extending laterally across the top front of said cab at the rear of said air inlet passageway, and conditioned air delivery openings in said conditioned air passageway of said headliner for delivering conditioned air directly into said cab.

8. The structure of claim 7 and further comprising compartment walls in said visor portion of said headliner extending from said other wall of said cab defining a beverage and food storage compartment in said conditioned air passageway with an entry opening into said cab permitting access from the latter and openings in at least one of said compartment walls permitting flow of conditioned air from said conditioned air passageway into said storage compartment.

9. The structure of claim 7 wherein said air inlet passageway and said conditioned air passageway share an upright separating wall in the part of said headliner above said cab.

* * * * *